United States Patent [19]
Tanaka et al.

[11] Patent Number: 5,932,658
[45] Date of Patent: *Aug. 3, 1999

[54] COATING OF CARBOXYL-CONTAINING ACRYLIC COPOLYMER AND EPOXY-CONTAINING ACRYLIC COPOLYMER

[75] Inventors: Yasuo Tanaka, Suita; Takeshi Takagi, Yawata; Shigeyuki Sasaki, Nara; Makoto Shimizu, Osaka; Yoshitaka Okude, Hirakata, all of Japan

[73] Assignee: Nippon Paint Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/667,934

[22] Filed: Jun. 24, 1996

[30] Foreign Application Priority Data

Jun. 27, 1995 [JP] Japan .................................... 7-160652

[51] Int. Cl.$^6$ .................................................. C08L 33/14
[52] U.S. Cl. ........................... 525/208; 427/386; 525/166
[58] Field of Search .................................... 525/207, 208, 525/166; 427/386

[56] References Cited

U.S. PATENT DOCUMENTS

| | | | |
|---|---|---|---|
| 4,522,966 | 6/1985 | Funaki et al. ............................ | 524/114 |
| 5,270,392 | 12/1993 | Okude et al. ............................ | 525/117 |
| 5,276,097 | 1/1994 | Hoffmann et al. ....................... | 525/165 |
| 5,324,803 | 6/1994 | Sawada et al. .......................... | 526/273 |
| 5,367,004 | 11/1994 | Barsotti et al. ......................... | 525/117 |
| 5,374,682 | 12/1994 | Gouda et al. ............................ | 525/185 |
| 5,432,233 | 7/1995 | Miyazoe et al. ......................... | 525/106 |
| 5,648,417 | 7/1997 | Fushimi et al. .......................... | 525/166 |

FOREIGN PATENT DOCUMENTS

| | | |
|---|---|---|
| 353734 | 2/1990 | European Pat. Off. . |
| 48-22169 | 7/1973 | Japan . |
| 8-99968 | 4/1996 | Japan . |
| 361169 | 12/1972 | U.S.S.R. . |
| WO 95/15362 | 6/1995 | WIPO . |

OTHER PUBLICATIONS

Caplus accession No. 1976:5721, Gladkikh et al., Zh. Org. Khim., vol. 11, No. 8, pp. 1616–1619, 1975.
Caplus accession No. 1995:659014, Huang et al., Gaofenzi Cailiao Kexue Yu Gongcheng, vol. 11, No. 3, pp. 23–27, 1995.

*Primary Examiner*—Robert E. Sellers
*Attorney, Agent, or Firm*—Townsend & Banta

[57] ABSTRACT

The present invention provides a curable resin composition having good curability and storage stability, which provides a cured film having excellent weather resistance, acid resistance and mar resistance. The curable resin composition comprises:

(a) 20 to 80% by weight of a polycarboxylic acid having an acid value of 25 to 300 mg KOH/g based on solid and a number average molecular weight of 500 to 20000; and (b) 20 to 80% by weight of a polyepoxide having an epoxy equivalent of 100 to 800 and a number average molecular weight of 500 to 20000, prepared by copolymerizing: (1) 10 to 60% by weight of a long-chain epoxy monomer; and (2) 40 to 90% by weight of an ethylenically unsaturated monomer having no epoxy group. The present invention also provides a process for forming a cured film using the resin composition.

5 Claims, No Drawings

COATING OF CARBOXYL-CONTAINING ACRYLIC COPOLYMER AND EPOXY-CONTAINING ACRYLIC COPOLYMER

FIELD OF THE INVENTION

The present invention relates to a curable resin composition which is suitable for an automotive top coating composition or a coil coating composition.

BACKGROUND OF THE INVENTION

A coating composition for coating the top surface of an automobile, generally contains, as a film forming binder, a combination of a hydroxyl group-containing polymer and a melamine curing agent. The cured film obtained from the melamine curing system, however, has poor acid resistance and is damaged by acid rain, which has recently become one of serious problems. The damage of the film results in poor appearance.

The poor acid resistance which is provided by using a melamine resin is believed to be originate from a triazine nucleus in the melamine resin. Accordingly, a drawback of poor acid resistance is not dissolved, so far as a melamine resin is used as a curing agent.

A novel coating compositions which does not employ the melamine curing agent is proposed in Japanese Kokai Publications 45577/1990, 287650/1991. The similar coating compositions are also disclosed in U.S. Pat. Nos. 2,977,334 (to Zopf et al.), 3,399,109 (to Zimmerman et al.) and 3,528,935 (to Marion et al.). The proposed coating compositions are acid-epoxy type, and an acid group and an epoxy group contained therein reacts to form an ester bond when curing. The ester bond functions as a crosslinking point of the coated film.

The coated film which has a crosslinking point of ester bond has good acid resistance and sufficient weather resistance for an automotive top coating application, by comparison with the conventional acrylic-melamine type coated film.

However, the coated film h s a problem that it is easily damaged by brushing, for example, in the use of a car washing machine. If degree of crosslinking is raised in order to impart good mar resistance against the mechanical car washing in this curing system, the resulting cured film has poor extensibility and becomes hard and brittle. The hard and brittle film brings another problems that it easily cracks, particularly when it is formed on a sealer for an automobile which is a resin material for filling in a gap between sheet metals, because such a film hardly responds to expansion and contraction of the sealer. It is therefore difficult to use the proposed coating compositions as a top coating composition for the automobiles.

In order to solve the above mentioned problems, the applicants proposed a coating composition which includes an acid component having a soft segment. The resulting coating composition however has poor curability and storage stability, and it should also be more improved in mar resistance.

SUMMARY OF THE INVENTION

The present invention provides a curable resin composition having good curability and storage stability, which provides a cured film having excellent weather resistance, acid resistance and mar resistance.

The present invention thus provides a curable resin composition comprising:

(a) 20 to 80% by weight of a polycarboxylic acid having an acid value of 25 to 300 mg KOH/g based on solid and a number average molecular weight of 500 to 20000; and (b) 20 to 80 by weight of a polyepoxide having an epoxy equivalent of 100 to 800 and a number average molecular weight of 500 to 20000 prepared by copolymerizing:

(1) 10 to 60% by weight of an epoxy group-containing ethylenically unsaturated monomer represented by the formula:

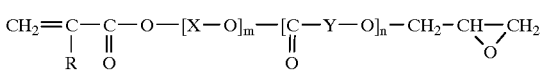

wherein, R represents a hydrogen atom or a methyl group, X represents a linear or branched saturated or unsaturated hydrocarbon moiety having 2 to 6 carbon atoms, Y represents a linear alkylene group having 4 to 6 carbon atoms, m represents an integer of 1 to 6, n represents an integer of 0 to 6; and (2) 40 to 90% by weight of an ethylenically unsaturated monomer having no epoxy group.

With the proviso, the amounts of the components (a) and (b) is based on weight of the total solid content of the the curable resin composition. Hereinafter, the wording "monomer" means "ethylenically unsaturated monomer".

DETAILED DESCRIPTION OF THE INVENTION

A polycarboxylic acid (a) to be used in the present invention has 2 or more carboxyl groups per molecule on average. The polycarboxylic acid has an acid value of 25 to 300 mg KOH/g, preferably 50 to 250 mg KOH/g, more preferably 100 to 200 mg KOH/g, and a number average-molecular weight (Mn) of 500 to 20000, preferably 1000 to 15000, more preferably 1300 to 14000.

The polycarboxylic acid is obtained by copolymerizing 5 to 80%, preferably 5 to 70%, more preferably 5 to 65% by weight of a carboxyl group-containing monomer, and 20 to 95%, preferably 30 to 95%, more preferably 35 to 95% by weight of a monomer having no carboxyl group, according to a method known to the art.

For example, the copolymerization can be carried out at a polymerization temperature of 80 to 200° C. for a polymerization period of 3 to 10 hours under normal or applied pressure, using an azo or peroxide compound as a radical polymerization initiator in an amount of 0.5 to 15 parts by weight, based on 100 parts by weight of the total monomers. A conventional polymerization-regulator such as a chain transfer agent, a color protection agent and the like may be added during the polymerization.

Examples of the carboxyl group-containing monomer include, for example, acrylic acid, methacrylic acid, itaconic acid, maleic acid, an adduct of these with ε-caprolactone (e.g., "Allonix M-5300", available from Toa Gosei Kagaku Co., Ltd., etc.), an adduct of an hydroxyl group-containing monomer with an acid anhydride group-containing compound, and an adduct of an acid anhydride group-containing monomer with a monoalcohol. These monomers can be used alone or in combination with the two or more.

The hydroxyl group-containing monomer employed herein is not specifically limited, but those having 6 to 23 carbon atoms are preferred. Examples thereof include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, reaction products of these with ε-caprolactone, and compounds prepared by esterifying (meth)acrylic acid with an excess amount of diols (e.g. 1,4-butanediol, 1,6-hexanediol, polyethylene glycol, polypropylene glycol, etc.).

These compounds are commercially available, and examples thereof include 4-bydroxybutyl acrylate "4HBA" and 4-hydroxybutyl methacrylate "4HBMA" (available from Mitsubishi Chemical Co., Ltd.), and "Placcel FM-1" and "Placcel FA-1" (available from Daicel Kagaku Kogyo Co., Ltd.). Examples of a propylene oxide monomer include "Blemmer PP-1000" and "Blemmer PP-800", examples of an ethylene oxide monomer include "Blemmer PE-90", available from Nippon Oil & Fat Co., Ltd.

The acid anhydride group-containing compound generally provides a carboxy functional group, by half-esterifying it with a hydroxyl group in an ambient reaction condition such as room temperature to 150° C. under normal pressure. It is preferred to be used herein an acid anhydride group-containing compound having 8 to 12, particularly 8 to 10 carbon atoms, which has a (unsaturated or saturated) cyclic group. Compatibility of the resulting resin may be improved by using such a component. Examples of the preferred acid anhydride group-containing compound include phthalic anhydride, tetrahydrophthallc anhydride, hexahydrophthalic anhydride, 4-methyl hexahydrophthalic anhydride, trimellitic anhydride, succinic anhydride, etc.

Examples of the acid anhydride group-containing monomer to be used herein include itaconic anhydride, maleic anhydride, citraconic anhydride, etc.

Examples of the monoalcohol to be used herein include methanol, ethanol, n-propanol, i-propanol, n-butanol, i-butanol, t-butanol, n-hexyl alcohol, lauryl alcohol, methyl cellosolve, ethyl cellosolve, methoxypropanol, ethoxypropanol, furfuryl alcohol, acetol, allyl alcohol, propargyl alcohol, etc.

Examples of the monomer having no carboxyl group include styrene, α-methylstyrene, p-t-butylstyrene, (meth)acrylate (e.g. methyl (meth)acrylate, ethyl (meth)acrylate, propyl (meth)acrylate, n-, i- and t-butyl (meth)acrylate, 2-ethylhexyl (meth)acrylate, lauryl (meth)acrylate, cyclohexyl (meth)acrylate, isobornyl (meth)acrylate), etc.). VeoVa-9 and VeoVa-10 available from Shell Co., etc. When styrene or a styrene derivative is used as the monomer having no carboxyl group, it is preferred to be used in an amount of 5 to 40% by weight.

A preferred polycarboxylic acid (a) of the curable resin composition of the present invention, has a carboxyl group and a carboxylate group, because acid resistance of the resulting coated film is improved. It is preferred that the carboxyl group and the carboxylate group respectively bond to adjacent carbon atoms of the main chain of the polymer. The polyearboxylic acid (a) having carboxyl and carboxylate groups is obtained, for example, by reacting a polyacid anhydride (a)(1) with a monoalcohol (a)(2).

The polyacid anhydride (a)(1) is obtained by copolymerizing 10 to 50%, preferably 10 to 30% by weight of an acid anhydride group-containing monomer (a)(1)(i); and 50 to 90%, preferably 70 to 90% by weight of a monomer having no acid anhydride group (a)(1)(ii). When an amount of the acid anhydride group-containing monomer (a)(1)(i) is less than 10% by weight, curability of the resulting curable resin composition becomes poor, and is more than 50% by weight, storage stability becomes poor. Examples of the acid anhydride group-containing monomer (a)(1)(i) include those described above.

The monomer having no acid anhydride group (a)(1)(ii) is not specifically limited unless it exerts a harmful influence on an acid anhydride group. Preferred are those having 3 to 15, particularly 3 to 12 carbon atoms, which has one ethylenically unsaturated bond. Examples thereof include those described above as the monomer having no carboxyl group.

A mixture of 2 or more monomers is also may be used as the monomer having no acid anhydride group (a)(1)(ii), because it is effective to improve compatibility between resins.

The carboxyl group-containing monomer (a)(1)(iii), such as acrylic acid, methacrylic acid, itaconic acid, maleic acid, etc. can also be used as the monomer having no acid anhydride group (a)(1)(ii). Meanwhile, among the monomer having no acid anhydride group (a)(1)(ii), those which is different from the carboxyl group-containing monomer (a) (1) (iii), are hereinafter referred to as "monomer having neither acid anhydride nor carboxyl groups (a)(1)(iv)".

In this instance, the polyacid anhydride (a)(1) is obtained by copolymerizing 10 to 50%, preferably 10 to 30% by weight of an acid anhydride group-containing monomer (a) (1)(i); 5 to 90% by weight, preferably 10 to 90% by weight of a carboxyl group-containing monomer (a)(1)(iii); and 0 to 85% by weight, preferably 0 to 80% by weight of a monomer having neither acid anhydride nor carboxyl groups (a)(1)(iv). When an amount of the carboxyl group-containing monomer (a) (1)(iii) is less than 5% by weight, mar resistance of the resulting coated film becomes poor, and is more than 90% by weight, curability of the resulting curable resin composition becomes poor.

As the carboxyl group-containing monomer (a)(1)(iii), it is preferred to be used a long-chain carboxylic acid monomer, because mar resistance of the coated film is improved. The long-chain carboxylic acid monomer refers to those which have a spacer moiety of about 5 to 20 carbon atoms between an ethylenically unsaturated group and a carboxyl group. Specific examples thereof include an adduct of the carboxyl group-containing monomer with ε-caprolactone (e.g. "Allonix M-5300", available from Toa Gosei Kagaku Co., Ltd.).

For example, the carboxyl group-containing monomer (a)(1)(iii) obtained by half esterifying a hydroxyl group-containing monomer with an acid anhydride group-containing compound, in an amount that the molar ratio of the hydroxyl group to the acid anhydride group becomes 1/0.5 to 1/1.0, preferably 1/0.8 to 1/1.0, can also be used. When the molar ratio is more than 1/0.5, viscosity of the polymer becomes high, and handling ability of the polymer becomes poor. On the other hand, when the molar ratio is less than 1/1.0, the excessive acid anhydride group-containing compound remains in the resulting coated film, which results in poor water resistance.

The hydroxyl group-containing monomer to be used herein preferably has 6 to 23 carbon atoms, more preferably 6 to 13 carbon atoms. When a carbon chain of the monomer is too short, flexibility around a crosslinking point becomes poor, and the resulting coated film becomes too hard. On the other hand, when the carbon chain is too long, a molecular weight between crosslinking points becomes too large. Generally, the hydroxyl group-containing monomer has a structure represented by the formula:

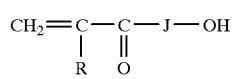

(II)

wherein R is a hydrogen atom or a methyl group, and J is an organic chain represented by the formula:

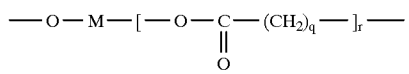

wherein M is a linear or branched alkylene group having 2 to 8 carbon atoms, q is an integer of 3 to 7 and r is an integer of 0 to 4, or an organic chain represented by the formula:

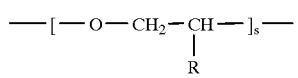

wherein R is a hydrogen atom or a methyl group and s is an integer of 2 to 50.

Examples thereof include those described above in order to prepare the carboxyl group-containing monomer. Examples of the acid anhydride group-containing compound to be used herein also include those described above in order to prepare the carboxyl group-containing monomer.

The half esterification reaction between the hydroxyl group-containing monomer and the acid anhydride group-containing compound is carried out at a temperature of room temperature to 150° C. according to a method known to the art.

The copolymerization of the acid anhydride group-containing monomer (a)(1)(i) and the monomer having no acid anhydride group (a)(1)(ii) is carried out by a known method such as solution polymerization described above.

A number-average molecular weight of the resulting polyacid anhydride is 500 to 20000, preferably 1000 to 15000, more preferably 1500 to 14000. When the number-average molecular weight is more than 20000, compatibility between the resins becomes poor, which results in poor appearance of the coated film. On the other hand, when the number-average molecular weight is less than 500, curability of the resin composition becomes insufficient. The molecular weight of the polymer employed in the present invention is determined by GPC method.

The resulting polyacid anhydride has at least two acid anhydride groups, preferably 3 to 25 acid anhydride groups, per molecule on average. When the number of the acid anhydride groups per molecule is less than 2, curability of the curable resin composition becomes insufficient. On the other hand, when it is more than 25, the resulting coated film becomes too hard and brittle, which results in poor weather resistance.

Then, the resulting polyacid anhydride (a)(1) is reacted with a monoalcohol (a)(2) in the proportion so that the molar ratio of the acid anhydride group to the hydroxyl group becomes 1/10 to 1/1, preferably 1/5 to 1/1.3, more preferably 1/2.0 to 1/1 to prepare the polycarboxylic acid (a) having carboxyl and carboxylate groups. When the molar ratio is less than 1/10, an amount of the excessive alcohol becomes too large, which causes pinholes at the step of curing. On the other hand, when the molar ratio is more than 1/1, the excessive anhydride group remains in the resulting resin composition, and storage stability becomes poor.

It is preferred that the monoalcohol (a)(2) which can be used in the present invention has 1 to 12, preferably 1 to 8 carbon atoms. Such a monoalcohol evaporates when heating, and is convenient for regenerating an acid anhydride group. Examples of the preferred monoalcohol include those above described in order to prepare the carboxyl group-containing monomer. Particularly preferred examples include acetol, furfuryl alcohol, allyl alcohol, propargyl alcohol, ethanol and methanol.

The resulting polycarboxylic acid (a) having carboxyl and carboxylate groups has an acid value of 25 to 300 mg KOH/g, preferably 50 to 250 mg KOH/g based on solid. When the acid value is less than 25 mg KOH/g, curability of the resulting curable resin composition becomes poor. On the other hand, when it is more than 300 mg KOH/g, storage stability becomes poor.

The polycarboxylic acid (a) component is contained in an amount of 20 to 80% by weight, preferably 30 to 70% by weight, more preferably 35 to 65% by weight, based on weight of the total solid content of the curable resin composition. When an amount of the polycarboxylic acid (a) component is less than 20% by weight, mar resistance of the resulting coated film becomes poor, and is more than 80% by weight, the coated film becomes too soft and acid resistance becomes poor.

A polyepoxide (b) to be used in the present invention is a copolymer of a long-chain epoxy monomer (b)(1) and a monomer having no epoxy group (b)(2). The long-chain epoxy monomer (b)(1) refers to those which have a spacer moiety of about 5 to 30 carbon atoms between an ethylenically unsaturated group and an epoxy group.

The epoxy group and the ethylenically unsaturated group are apart each other in the long-chain epoxy monomer. The polyepoxide (b) prepared by using the monomer, has the epoxy group which is pendent apart from the main chain. When a polycarboxylic acid is cured by using the polyepoxide, flexibility around a crosslinking point in the matrix of the coated film is improved. As a result, elongation of the coated film becomes high, and mar resistance and sealer cracking resistance becomes excellent.

The long-chain epoxy monomer (b)(1) has generally 9 to 26, preferably 9 to 16 carbon atoms. When the monomer has less than 9 carbon atoms, flexibility around the crosslinking point becomes small, and mar resistance and sealer cracking resistance of the coated film becomes poor. On the other hand, when the monomer has more than 26 carbon atoms, the flexibility becomes too large, and curability of the coating composition becomes poor and the coated film becomes too soft.

Preferred long-chain epoxy monomer (b)(1) is the compound represented in the chemical formula (I). Particularly preferred long-chain epoxy monomer (b)(1) includes the following compounds.

(A) 4-Hydroxybutyl glycidyl ether acrylate (MW=200)

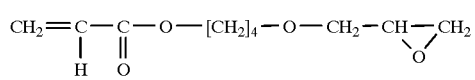

(B) Dipropylene glycol glycidyl ether acrylate (MW=258)

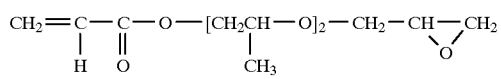

(C) Diethylene glycol glycidyl ether acrylate (MW=216)

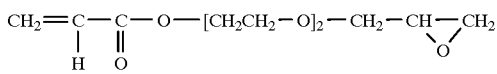

(D) 6-Hydroxyhexyl glycidyl ether acrylate (MW=228)

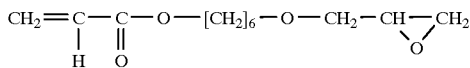

(E) Ethylene glycol methacrylate 6-(2,3-epoxypropanoxy) hexanoate (MW=300)

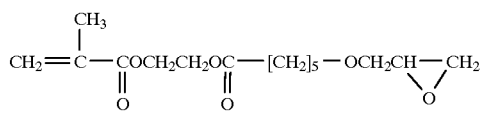

The monomer having no epoxy group (b)(2) to be used is not particularly limited, but includes those described above as the monomer having no acid anhydride group (a)(1)(ii) in order to prepare the polyacid anhydride (a)(1). These can be used alone or in combination with the two or more. The copolymerization can also be carried out as described above.

The polyepoxide (b) is prepared by copolymerizing, 10 to 60%, preferably 15 to 40% by weight of the long-chain epoxy monomer (b)(1), 40 to 90%, preferably 60 to 85% by weight of the monomer having no epoxy group (b)(2). When an amount of the monomer (b)(1) is less than 10% by weight, curability of the resulting curable resin composition becomes poor. When the amount is more than 60% by weight, the resulting coated film becomes too hard and weather resistance becomes poor.

The polyepoxide (b) obtained by the copolymerization has a number average molecular weight of 500 to 20000, preferably 1000 to 10000, more preferably 1000 to 8000. If the number average molecular weight is less than 500, curability of the resulting curable resin composition becomes poor, and is more than 20000, storage stability becomes poor. The polyepoxide (b) has an epoxy equivalent of 100 to 800, preferably 200 to 800, more preferably 300 to 700. If the epoxy equivalent is more than 800, curability of the resulting curable resin composition becomes poor, and is less than 100, storage stability becomes poor.

A hydroxyl group-containing monomer (b)(3) may also be employed as the monomer having no epoxy group (b)(2). Particularly preferred hydroxyl group-containing monomer (b)(3) to be used in the present invention is the compound represented by the formula (II), which was described above in order to prepare the monomer having no acid anhydride group (a)(1)(ii). Meanwhile, among the monomer having no epoxy group (b)(2), those which is different from the hydroxyl group-containing monomer (b)(3), are hereinafter referred to as "monomer having neither epoxy nor hydroxyl groups (b)(4)".

When the hydroxyl group-containing monomer (b)(3) is employed as the monomer having no epoxy group, adhesion of the resulting coated film is improved, and the coated film provides excellent adhesiveness in case of recoating. The polyepoxide (b) which is prepared by using the hydroxyl group-containing monomer (b)(3), contains a hydroxyl group and an epoxy group. Such a polyepoxide (b) having hydroxyl and epoxy groups, reacts and bonds with the polycarboxylic acid (a) at the both functional groups which are the hydroxyl group and the epoxy group, and the strong coated film having excellent weather resistance is formed.

In this instance, the polyepoxide (b) is prepared by copolymerizing 10 to 60%, preferably 15 to 40%, more preferably 20 to 40% by weight of the long-chain epoxy monomer (b)(1), 5 to 60%, preferably 10 to 50%, more preferably 15 to 40% by weight of the hydroxyl group-containing monomer (b)(3), and 0 to 85%, preferably 10 to 75%, more preferably 20 to 65% by weight of the monomer having neither epoxy nor hydroxyl groups (b)(4). If an amount of the monomer (b)(3) is less than 5% by weight, curability of the resulting resin composition becomes poor, and is more than 60% by weight, storage stability becomes poor.

The polyepoxide (b) having hydroxyl and epoxy groups has a hydroxyl value of 30 to 300, preferably 50 to 250, more preferably 50 to 200. If the hydroxyl value is less than 30, curability of the resulting curable resin composition becomes poor, and is more than 300, water resistance of the coated film becomes poor.

The polyepoxide (b) having hydroxyl and epoxy groups has 2 to 12, preferably 3 to 12 epoxy groups per molecule on average, and 1 to 20, preferably 1 to 17 hydroxyl groups.

The polyepoxide (b) component is contained in the curable resin composition in an amount of 20 to 80%, preferably 30 to 70%, more preferably 35 to 65% by weight based on weight of the total solid content of the curable resin composition. If an amount of the polyepoxide (b) is less than 20% by weight, acid resistance of the resulting coated film becomes poor, and is more than 80% by weight, mar resistance becomes poor.

Thus obtained polycarboxylic acid (a) and polyepoxide (b) are formulated to obtain the curable resin composition of the present invention.

The formulation of the polycarboxylic acid (a) and the polyepoxide (b) can be carried out according to an amount and a method known to those skilled in the art. When using the polycarboxylic acid having carboxyl and carboxylate groups as the polycarboxylic acid (a) and using a polyepoxide having hydroxyl and epoxy groups as the polyepoxide (b), there can be obtained a curable resin composition which forms a coated film having good acid resistance and mar resistance.

In this instance, it is preferred that the components are formulated in an amount so that the molar ratio of a carboxyl group contained in the polycarboxylic acid (a) to an epoxy group contained In the polyepoxide (b) becomes 1/1.2 to 1/0.6, preferably 1/1.0 to 1/0.8, and the molar ratio of a carboxylate group contained in the polycarboxylic acid (a) to a hydroxyl group contained in the polyepoxide (b) becomes 1/1.5 to 1/0.5, more preferably 1/1.4 to 1/0.8.

When the ratio of the carboxyl group contained in the polycarboxylic acid (a) to the epoxy group contained in the polyepoxide (b) is less than 1/1.2, the resulting coated film may become yellow, and is more than 1/0.6, curability of the resulting curable resin composition becomes poor. When the ratio of the carboxylate group contained in the polycarboxylic acid (a) to the hydroxyl group contained in the polyepoxide (b) is less than 1/1.5, water resistance of the resulting coated film becomes poor, and is more than 1/0.5, curability of the resulting curable resin composition becomes poor. An amount of each components for the formulation can be calculated from hydroxyl value, acid value and epoxy equivalent of the components, according to the calculation method known to those skilled in the art.

Curing mechanism of the curable resin composition of the present invention thus obtained is as follows. That is, a carboxyl group and a carboxylate group in the polycarboxylic acid (a) reacts together by heating, and an acid anhydride group and a free monoalcohol are formed in the polycarboxylic acid (a). The free monoalcohol evaporates and leaves from the system. The acid anhydride group formed in the polycarboxylic acid (a) reacts with a hydroxyl group contained in the polyepoxide (b), and a crosslinking point is formed and a carboxyl group is generated again. This carboxyl group reacts with an epoxy group in the polyepoxide (b), and a crosslinking point is formed. In such way, two polymers reacts together to cure, and high density of crosslinking is provided.

In addition to the polycarboxylic acid (a) and the polyepoxide (b), the curable resin composition of the present invention may contain a curing catalyst which is generally used for the esterification reaction between an acid and an epoxide, such as quaternary ammonium salts. Examples of the other catalyst which can be used for a curable resin composition of the present invention include benzyltriethylammonium chloride, benzyltriethylammonium bromide; tetrabutylammonium chloride, tetrabutylammonium bromide, tetrabutylammonium salicylate, tetrabutylammonium glycolate, tetrabutylammonium paratoluenesulfonate, tetrabutylammonium nitrate, tetrabutylammonium dibutylphosphate, tetrabutylammonium di-2-ethylhexylphosphate; trimethylbenzylammonium dibutylphosphate; trimethylcetylammonium butylphosphate; octyltrimethylammonium dimethylphosphate; dodecyltrimethylammonium diphenylphosphate, etc. These curing catalysts may be used in combination with the two or more. The curing catalysts are generally used in an amount of 0.1 to 2.0% by weight based on the solid content of the curable resin composition.

In addition, a tin compound may be used in combination with these catalysts, as is described in Japanese Laid-Open Patent Publication Nos. 2-151651 and 2-279713. Examples of the tin catalyst include dimethyltin bis-(methyl maleate), dimethyltin bis-(ethyl maleate), dimethyltin bis-(butyl maleate), dibutyltin bis-(butyl maleate), dibutyltin bis-(dodecylbenzen sulfonate), etc. The curing catalysts and the tin catalysts are generally used in an amount of 0.1 to 3.0% by weight based on the solid content of the curable resin composition.

In order to improve weather resistance of the coated film, an ultraviolet absorber, a hindered amine lightstabilizer and an antioxidant may be added. Crosslinked resin particles for controlling rheology, and a surface modifier for modifying appearance of the coated film may also be added. Furthermore, in order to control viscosity, alcoholic solvents (e.g. methanol, ethanol, propanol, butanol, etc.) and hydrocarbon and ester solvents may be used.

When the crosslinked resin particles are used, they are added in an amount of 0.01 to 10 parts by weight, preferably 0.1 to 5 parts by weight, based on 100 parts by weight of the resin solid of the curable resin composition of the present invention. When an amount of the crosslinked resin particles exceeds 10 parts by weight, appearance of the coated film becomes poor. On the other hand, when it is smaller than 0.01 parts by weight, no rheology controlling effect is obtained.

A resin to be used in the present invention has an acid group as a functional group. Accordingly, it is also possible to prepare an aqueous resin composition comprising water as a medium by neutralizing the acid group with amine.

The curable resin composition of the present invention is suitably used for a clear coating composition. The clear coating composition is generally applied on a base coating layer formed from a base coating composition which is either aqueous or solvent type and contains color pigment. It is also preferred that the clear coating composition is applied on the base coating layer without curing the base coating layer and then the composite layer is baked to cure (two-coat one-bake curing method).

In case where the aqueous base coating composition is employed in the two-coat one-bake method, the base coating layer, if necessary, is heated at 60 to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The coating composition of the present invention may be prepared by art-known methods. An enamel paint, for example, may be prepared by mixing and dispersing the ingredients using kneader or roll.

The coating composition may be applied on a substrate by spraying, brushing, dipping, roll coating, flow coating and the like. The substrate may be primed or intercoated by art-known methods if necessary. Any conventional primer coating composition or base coating composition may be used in this instance.

The substrate can be any one, including wood, metal, glass, fabric, plastics, plastic foam and the like. Preferred are plastics, metals (e.g. steel and aluminum) and alloys thereof.

The film thickness of the resulting coating layer may be varied depending upon its usage, but in many cases within the range of 0.5 to 3 mil.

The coated coating layer is generally cured by heating at a temperature of 100 to 180° C., preferably 120 to 160° C. Curing time may be varied by curing temperature, but generally for 10 to 30 minutes at a temperature of 120 to 160° C.

EXAMPLES

The present invention is illustrated by the following Examples which, however, are not to be construed as limiting the present invention to their details. The amounts described herein means "parts by weight", unless otherwise indicated.

Preparative Examples 1 to 18

Preparative Examples 1 to 18 illustrate a preparation of the polycarboxylic acid (a) having carboxyl and carboxylate groups.

Preparative Example 1

Preparation of Polyanhydride (a)(1)

A reaction vessel equipped with a thermometer, a stirrer, a cooling tube, a nitrogen inlet tube and a dropping funnel was charged with 150 parts of xylene, 110 parts of "S-100" (An aromatic hydrocarbon solvent available from Esso Co.), 180 parts of "Arco Solv PMA" (An organic solvent available from Kyowa Yuka K.K.). A temperature of the content was raised to 130° C.

To the vessel, a monomer and initiator solution consisting of 300 parts of styrene, 20 parts of 2-ethylhexyl acrylate, 80 parts of 2-ethylhexyl methacrylate, 250 parts of maleic anhydride, 300 parts of Arco Solv PMA, 440 parts of the carboxyl group-containing monomer obtained by reacting "Placcel FA-1" (ε-caprolactone acrylate available from Daicel Kagaku Kogyo Co., Ltd.) and hexahydrophthalic anhydride in the equimolar amount, and 100 parts of t-butylperoxy-2-ethyl hexanoate, was added dropwise over 3 hours with stirring. After an end of the addition, the reaction was continued for additional 2 hours with stirring to obtain a varnish having a solid content of 54%, which contains a polyacid anhydride having carboxyl and acid anhydride groups A-I'. The number-average molecular weight was 2800.

Preparative Examples 2 to 8
Preparation of Polyanhydride (a)(1)

The polyacid anhydrides having a carboxyl group and an acid anhydride group A-II' to A-VIII' were prepared according to substantially the same manner as described in Preparative Example 1, except that the compositions tabulated in the following Tables 1 and 2 were used.

TABLE 1

|  | No. of prep. examples | | | | |
|---|---|---|---|---|---|
|  | 1 | 2 | 3 | 4 | 5 |
| No. of polyacid anhydrides | A-I' | A-II' | A-III' | A-IV' | A-V' |
| S-100[1] | 110 | 500 | 200 | 300 | 300 |
| Xylene | 150 | 200 | 261 | 200 | 300 |
| PMA[2] | 180 | 250 | 200 | 280 | 160 |
| Styrene | 300 | 400 | 300 | 400 | 500 |
| 2-Ethylhexyl acrylate | 20 | — | — | 350 | 140 |
| 2-Ethylhexyl methacrylate | 80 | — | — | 55 | 165 |
| Cyclohexyl acrylate | — | 343 | — | — | — |
| Butyl methacrylate | — | — | 200 | — | — |
| Isobutyl acrylate | — | — | 75 | — | — |
| Isobutyl methacrylate | — | — | — | — | — |
| Maleic anhydride | 250 | — | 425 | 195 | 195 |
| Itaconic anhydride | — | 257 | — | — | — |
| Arco Solv PMA | 300 | 250 | 400 | 200 | 200 |
| FA-1 + HHPA[3] | 440 | — | — | — | — |
| t-BP-2-EH[4] | 100 | 200 | 20 | 100 | 80 |
| Solid content (%) | 54 | 50 | 49 | 53 | 53 |
| Mn[5] | 2800 | 1500 | 1340 | 3500 | 4000 |

[1]Aromatic hydrocarbon solvent available from Esso K.K.
[2]Organic solvent available from Kyowa Yuka K.K.
[3]Carboxyl group-containing monomer obtained by reacting "Placcel FA-1" and hexahydrophthalic anhydride in an equimolar amount
[4]t-Butyl peroxy-2-ethyl hexanoate
[5]Number average molecular weight

TABLE 2

|  | No. of prep. examples | | |
|---|---|---|---|
|  | 6 | 7 | 8 |
| No. of polyacid anhydrides | A-VI' | A-VII' | A-VIII' |
| S-100[1] | 300 | 310 | 110 |
| Xylene | 300 | 400 | 150 |
| PMA[2] | — | — | 180 |
| Styrene | 400 | 500 | 300 |
| 2-Ethylhexyl acrylate | — | — | 100 |
| 2-Ethylhexyl methacrylate | — | — | 300 |
| Cyclohexyl acrylate | — | 129 | — |
| Butyl methacrylate | — | — | — |
| Isobutyl acrylate | 100 | — | — |
| Isobutyl methacrylate | 158 | — | — |
| Maleic anhydride | — | — | 300 |
| Itaconic anhydride | 342 | 371 | — |
| Arco Solv PMA | 362 | 300 | 300 |

TABLE 2-continued

|  | No. of prep. examples | | |
|---|---|---|---|
|  | 6 | 7 | 8 |
| FA-1 + HHPA[3] | — | — | — |
| t-BP-2-EH[4] | 80 | 50 | 100 |
| Solid content (%) | 53 | 51 | 57 |
| Mn[5] | 4000 | 7000 | 3000 |

[1]Aromatic hydrocarbon solvent available from Esso K.K.
[2]Organic solvent available from Kyowa Yuka K.K.
[3]Carboxyl group-containing monomer obtained by reacting "Placcel FA-1" and hexahydrophthalic anhydride in an equimolar amount
[4]t-Butyl peroxy-2-ethyl hexanoate
[5]Number average molecular weight Preparative Example 9
Preparation of Polycarboxylic Acid (a)

A reaction vessel equipped with a thermometer, a stirrer, a cooling tube, a nitrogen inlet tube and a dropping funnel was charged with 193 parts of the polyacid anhydride A-I' prepared in Preparative Example 1 and 12 parts of methanol. The content was heated to 60° C. and stirred over 36 hours for reacting. When an absorption due to an anhydride group (1785 cm$^{-2}$) was disappeared under analysis of infrared absorption spectra, the reaction mixture was cooled and evacuated from the vessel to provide a polycarboxylic acid having carboxyl and carboxylate groups A-I. The acid value was 158 mg KOH/g (based on solid).

Preparative Examples 10 to 16
Preparation of Polycarboxylic Acid (a)

The polycarboxylic acid having carboxyl and carboxylate groups A-II to A-VIII were prepared according to substantially the same manner as described in Example 9, except that the compositions tabulated in the following Tables 3 and 4 were used. Acid value of the resulting polymers are also indicated in the Tables.

TABLE 3

|  | No. of prep. examples | | | | |
|---|---|---|---|---|---|
|  | 9 | 10 | 11 | 12 | 13 |
| No. of obtained polycarboxylic acids | A-I | A-II | A-III | A-IV | A-V |
| No. of anhydrides |  |  |  |  |  |
| A-I' | 193 | — | — | — | — |
| A-II' | — | 222 | — | — | — |
| A-III' | — | — | 208 | — | — |
| A-IV' | — | — | — | 197 | — |
| A-V' | — | — | — | — | 194 |
| Methanol | 12 | — | — | 8 | 8 |
| Ethanol | — | 6 | — | — | — |
| Propargyl alcohol | — | — | 30 | — | — |
| Acid value (mg KOH/g) | 158 | 129 | 244 | 112 | 112 |

TABLE 4

|  | No. of prep. examples | | |
|---|---|---|---|
|  | 14 | 15 | 16 |
| No. of obtained polycarboxylic acid | A-VI | A-VII | A-VIII |
| No. of anhydrides |  |  |  |
| A-VI' | 197 | — | — |

TABLE 4-continued

|  | No. of prep. examples | | |
| --- | --- | --- | --- |
|  | 14 | 15 | 16 |
| A-VII' | — | 199 | — |
| A-VIII' | — | — | 184 |
| Methanol | — | — | 12 |
| Ethanol | — | 12 | — |
| Propargyl alcohol | — | — | — |
| Acetol | 28 | — | — |
| Acid value (mg KOH/g) | 172 | 186 | 172 |

Preparative Example 17
Preparation of Comparative Polycarboxylic Acid

A reaction vessel equipped with a thermometer, a stirrer, a cooling tube, a nitrogen inlet tube and a dropping funnel was charged with 300 parts of xylene, 300 parts of "S-100" (An aromatic hydrocarbon solvent available from Esso Co.), 100 parts of "Arco Solv PMA" (An organic solvent available from Kyowa Yuka K.K.). A temperature of the content was raised to 130° C.

To the vessel, a monomer and initiator solution consisting of 300 parts of styrene, 100 parts of 2-ethylhexyl acrylate, 181 parts of 2-ethylhexyl methacrylate, 77 parts of methacrylic acid, 200 parts of Arco Solv PMA, 342 parts of the carboxyl group-containing monomer obtained by reacting "Placcel FA-1" (ε-caprolactone acrylate available from Daicel Kagaku Kogyo Co., Ltd.) and hexahydrophthalic anhydride in the equimolar amount, and 80 parts of t-butylperoxy-2-ethyl hexanoate, was added dropwise over 3 hours with stirring. After an end of the addition, the reaction was continued for additional 2 hours with stirring to obtain a varnish having a solid content of 51%, which contains a polycarboxylic acid having carboxyl and acid anhydride groups A-IX. The number-average molecular weight was 4000 and the acid value was 100 mg KOH/g (based on solid).

Preparative Example 18
Preparation of Comparative Polycarboxylic Acid

A varnish having a solid content of 43%, which contains a polycarboxylic acid having carboxyl and carboxylate groups A-X was prepared according to substantially the same manner as described in Preparative Example 17, except that the composition tabulated in the following Table 5 was used. The number-average molecular weight was 2000, the acid value was 154 mg KOH/g (based on solid).

TABLE 5

| Components | Parts by weight |
| --- | --- |
| Xylene | 700 |
| Arco Solv PMA | 350 |
| Styrene | 300 |
| 2-Ethylhexyl acrylate | 345.9 |

TABLE 5-continued

| Components | Parts by weight |
| --- | --- |
| Isobutyl methacrylate | 128.3 |
| Acrylic acid | 22.78 |
| Ardo Solv PMA | 300 |
| t-Butyl peroxy-2-ethyl hexanoate | 150 |

Preparative Examples 19 to 25

Preparative Examples 19 to 25 illustrate a preparation of the polyepoxide (b) having hydroxyl and epoxy groups.

Preparative Example 19

A reaction vessel equipped with a thermometer, a stirrer, a cooling tube, a nitrogen inlet tube and a dropping funnel, was charged with 20 parts of xylene, 15 parts of Arco Solv PMA. A temperature of the content was raised to 130° C.

To the vessel, a monomer and initiator solution consisting of 20 parts of styrene, 10 parts of 2-ethylhexyl acrylate, 10 parts of butyl methacrylate, 3.9 parts of cyclohexyl methacrylate, 20.4 parts of 4-hydroxybutyl acrylate, 35.7 parts of 4-hydroxybutyl glycidyl ether acrylate and 4.5 parts of t-butylperoxy-2-ethyl hexanoate, was added dropwise over 3 hours with stirring. The content was kept at 130° C. for 30 minutes, to which a mixture consisting of 1 part of t-butylperoxy-2-ethyl hexanoate and 10 parts of xylene was added dropwise over 30 minutes. After an end of the addition, the reaction was continued for additional 2 hours with stirring at 130° C. to obtain a colorless transparent varnish solution having a solid content of 75%, which comprises a polyepoxide having hydroxyl and epoxy groups B-I. The number average molecular weight was 6000, the hydroxy equivalent weight was 707 and the epoxy equivalent was 560.

Preparative Examples 20 to 23

The polyepoxide having hydroxyl and epoxy groups B-II to B-V were prepared according to substantially the same manner as described in Preparative Example 19, except that the compositions tabulated in the following Table 6 was used. Properties of the resulting polymers are also indicated the Table.

Preparative Examples 24 and 25

Preparative examples 24 and 25 illustrate a preparation of polyepoxides for comparative coating compositions.

Polyepoxides having hydroxyl and epoxy groups B-VI and B-VII are obtained according to substantially the same manner as described in Preparative Example 19, except that glycidyl methacrylate was used instead of 4-hydroxybutyl glycidyl ether acrylate. Properties of the resulting polymers are indicated Table 6.

TABLE 6

| | No. of prep. examples | | | | | | |
|---|---|---|---|---|---|---|---|
| | 19 | 20 | 21 | 22 | 23 | 24 | 25 |
| No. of obtained polyepoxides | B-I | B-II | B-III | B-IV | B-V | B-VI | B-VII |
| Solvents | | | | | | | |
| Xylene | 20 | 20 | 20 | 20 | 20 | 20 | 20 |
| S-100*1 | — | 10 | — | 10 | — | — | — |
| Arco Solv PMA*2 | 15 | 5 | 15 | 5 | 15 | 15 | 15 |
| Epoxy group-containing monomers | | | | | | | |
| 4-Hydroxybutyl glycidyl ether acrylate | 35.7 | — | — | — | — | — | — |
| Dipropylene glycol glycidyl ether acrylate | — | 46.1 | — | — | — | — | — |
| Diethylene glycol glycidyl ether acrylate | — | — | 32.4 | — | — | — | — |
| 6-Hydroxyhexyl glycidyl ether acrylate | — | — | — | 38.0 | — | — | — |
| Ethylene glycol methacrylate-6-(2,3-epoxypropanoxy)hexanoate | — | — | — | — | 30.0 | — | — |
| Glycidyl methacrylate | — | — | 35.5 | — | 6.1 | 25.3 | 47.3 |
| OH group-containing monomers | | | | | | | |
| 4-Hydroxybutyl acrylate | 20.4 | — | 20.6 | — | 28.8 | 21.8 | — |
| 2-Hydroxyethyl acrylate | — | — | — | 21.6 | — | — | — |
| 2-Hydroxyethyl methacrylate | — | 5.9 | — | — | — | — | 16.3 |
| Praccel FA-1*3 | — | 11.1 | — | — | — | — | — |
| Praccel FA-1*3 | — | — | — | 23.0 | — | — | — |
| Other monomers | | | | | | | |
| Styrene | 20 | 15 | 6.5 | 10 | 20 | 20 | 15 |
| 2-Ethylhexyl acrylate | 10 | 15 | 5.0 | 5 | 10 | — | 10 |
| n-Butyl methacrylate | 10 | — | — | — | 5.1 | 12.9 | — |
| Cyclohexyl methacrylate | 3.9 | 6.9 | — | 2.4 | — | 20 | 11.4 |
| t-Butyl peroxy-2-ethyl hexanoate | 4.5 | 10.0 | 10.0 | 6.0 | 3.0 | 4.5 | 9.0 |
| Properties | | | | | | | |
| Epoxy equivalent | 560 | 560 | 250 | 600 | 700 | 561 | 300 |
| Hydroxyl value | 80 | 50 | 80 | 160 | 112 | 85 | 70 |
| Mn | 6000 | 1800 | 2000 | 5000 | 8000 | 6000 | 3000 |

*1 Aromatic hydrocarbon solvent available from Esso K.K.
*2 Organic solvent available from Kyowa Yuka K.K.
*3 ε-caprolactone acrylate available from Daicel Kagaku Kogyo Co. Ltd.

Examples 1 to 11

Examples 1 to 11 illustrate coating compositions containing the polycarboxylic acids and the polyepoxides which were prepared in the Preparative Examples 1 to 23.

Example 1
Preparation of Crosslinked Resin Particles

213 Parts of bishydroxyethyl taurine, 208 parts of neopentyl glycol, 296 parts of phthalic anhydride, 376 parts of azelaic acid and 30 parts of xylene were charged in a reaction vessel equipped with a stirring and heating device, a thermometer, a nitrogen introducing tube, a cooling tube and a decanter, and were heated. Water formed by the reaction was removed by azeotropic distillation with xylene. A reaction mixture in the vessel was heated to 210° C. over about 3 hours from the beginning of reflux, and was stirred and dehydrated until an acid value corresponding to carboxylic acid became 135. The reaction mixture was then cooled to 140° C., and added dropwise 500 parts of "Cardula E10" (versatic acid glycidyl ester manufactured by Shell Chemical Co.) over 30 minutes. Thereafter, the reaction was continued with stirring for 2 hours. An amphoteric ionic group-containing polyester resin having an acid value (solid content) of 55, a hydroxyl value of 91 and a number-average molecular weight of 1250 was obtained.

10 Parts of the amphoteric ionic group-containing polyester resin, 140 parts of deionized water, 1 part of dimethylethanolamine, 50 parts of styrene and 50 parts of ethylene glycol dimethacrylate were stirred vigorously in a stainless steel beaker to prepare a monomer suspension. In addition, 0.5 parts of azobiscyanovaleric acid, 40 parts of deionized water and 0.32 parts of dimethylethanolamine were mixed to prepare an initiator aqueous solution.

To a reaction vessel equipped with a stirring and heating device, a thermometer, a nitrogen introducing tube and a cooling tube, 5 parts of the amphoteric ionic group-containing polyester resin, 280 parts of deionized water and 0.5 part of dimethylethanolamine and the mixture was heated to 80° C. The monomer suspension and 40.82 parts of the initiator aqueous solution were added dropwise, simultaneously, over 60 minutes, and the reaction was continued for 60 minutes and terminated. An emulsion of crosslinked resin particles having a particle size of 55 nm measured by a dynamic light scattering method was obtained.

Xylene was added to the emulsion and water was removed by azeotropic distillation under reduced pressure to obtain a xylene solution of crosslinked resin particles having a solid content of 20% by weight.

Preparation of Clear Coating Composition

A curable resin composition was prepared by mixing the following components.

| Components | Parts |
| --- | --- |
| Polycarboxylic acid A-I (PEx. 9) | 73 |
| Polyepoxide B-I (PEx. 19) | 100 |
| 20% Ethanol solution of tetrabutylammonium bromide | 1.5 |
| 30% Xylene solution of Scat-30 | 0.33 |
| Tinubin-384 (solid) | 2.0 |
| Tinubin-123 (solid) | 2.0 |
| 20% Xylene solution of crosslinked resin particles | 10.0 |
| Total | 188.83 |

The resulting resin composition was diluted with a solvent mixture of butyl acetate and xylene (1/1) to a viscosity of 25 second on a No.4 Ford cup to obtain a clear coating composition.

Evaluation of Coating Composition

Stability of the coating composition (Coating stability):

The resulting clear coating composition was stored for 10 days at 40° C. Viscosity increase of the stored coating composition was measured by using the Ford cup and evaluated according to the following criteria.

| Did not increase | ⊙ |
| --- | --- |
| Slightly increased | ○ |
| Certainly increased | Δ |
| Gelled | x |

Evaluation of Coated Film

Sealer cracking resistance:

The phosphated steel panel was coated with Power Top U-30 (electrodeposition paint available from Nippon Paint Co., Ltd.). The steel panel was then coated with a sealer for automobile in 5 mm thick, 10 mm width and 150 mm length, and further coated with an intercoating composition ("Orga P-2" available from Nippon Paint Co., Ltd.) on the wet-on-wet method. The coated panel was baked at 140° C. for 30 minutes to obtain a sealed and intercoated steel panel.

The panel was then base-coated with a solvent type metallic base paint (Super Lack M-90 available from Nippon Paint Co., Ltd.) and then further coated with the present coating composition on wet-on-wet method. The coated panel was baked at 140° C. for 30 minutes to obtain a cured film.

Meanwhile, the solvent type metallic base paint comprises 10.9 parts of aluminium pigment paste having an aluminium flake content of 65% ("Alpaste 7160N" available from Toyo Aluminium K.K.), 66.85 parts of thermocurable acrylic resin varnish having a solid content of 48% ("Almatex NT-U-448" available from Mitsui Toatsu Kagaku K.K.), 13.37 parts of melamine resin varnish having a solid content of 60% ("Uban 20N-60" available from Mitsui Toatsu Kagaku K.K.), 6.38 parts of toluene, 2.0 parts of butanol and 0.5 parts of triethylamine.

The resulting panel was visually checked whether crack is present on the surface of the panel or not, and evaluated under the following criteria. The results are shown in Table 10.

| No cracking | ○ |
| --- | --- |
| Slight cracking | Δ |
| Large cracking | x |

Preparation of Coated Film:

The phosphated steel panel was coated with Power Top U-30 (Electrodeposition paint available from Nippon Paint Co., Ltd.) and Orga P-2 (Intercoating paint available from Nippon Paint Co., Ltd.). The intercoated panel was then base-coated with a solvent type metallic base paint (Super Lack M-90 available from Nippon Paint Co., Ltd.) and then further coated with the present coating composition on the wet-on-wet method. The coated panel was baked at 140° C. for 30 minutes to obtain a cured film having a thickness of 40 μm.

The resulting cured film was evaluated as follows and the results obtained are shown in Table 10.

Acid Resistance:

The cured film was contacted with 0.2 ml of a 0.1 N $H_2SO_4$ aqueous solution at 60° C. for 2 hours and then observed and evaluated according to the following criteria.

| No change | ⊙ |
| --- | --- |
| Slightly changed | ○ |
| Definitely changed | Δ |

Mar Resistance:

One gram of 50% cleanser water solution (available from Kao Corp. as New Homing Cleanser containing 87% by weight of abrasive particles, 5% by weight of surfactant and the others) was coated on a flannel fabric (2×2 cm) and attached to a Gakushin-type color friction fastness tester (available from Daiei Xagaku Seiki K.K.). The cured film was rubbed with the fabric go and back 10 times at a load or 500 g, and then 20° G gloss was measured by a gloss meter (available from Suga Shikenki K.K.) before and after rubbing, and its change was expressed by percentage. The percentage is generally related to eye evaluation according to the following criteria.

| >90 | No change |
| --- | --- |
| 80 to 90 | Slight change but hardly to recognize |
| 70 to 80 | Recognizable change |
| 70> | Definite change |

Chipping Resistance:

The clear coated panel was cooled to −20° C., and it was set on the holder of Glavelo tester (a stone shooting machine available from Suga Shikenki K.K.). A broken stone was then struck on a coated surface of the panel under the following condition.

| Size of the stone | No. 7 broken stone of JIS A 5001 |
| --- | --- |
| Amount of the stone | 50 g |
| Air pressure for shooting the stone | 4.0 kg/cm² |
| Distance from the muzzle to the coating | 35 cm |
| Testing temperature | −20° C. |
| Striking angle | 45° |

A surface of the coated film was visually observed and degree of the damage was evaluated under the following criteria.

| No exfoliation | ○ |
| --- | --- |
| Slight exfoliation | Δ |
| Remarkable exfoliation | x |

Examples 2 to 7

Clear coating compositions containing crosslinked resin particles were prepared and evaluated according to substantially the same manner as described in Example 1, except that the compositions tabulated in the following Tables 7 and 8 were used. The results were shown in Table 10.

Example 8

Clear coating composition containing crosslinked resin particles was prepared according to substantially the same manner as described in Example 1, except that the composition tabulated in the following Table 8 was used.

A phosphated steel panel was then coated with Power Top U-30 (Electrodeposition paint available from Nippon Paint Co., Ltd.) and Orga P-2 (Intercoating paint available from Nippon Paint Co., Ltd.). The intercoated panel was base-coated with an aqueous type metallic base paint (The paint is described in Example 1 of U.S. Pat. No. 5,183,504.). After drying at 60° C. for 5 minutes, it was further coated with the above obtained clear coating composition in the method of wet-on-wet. The clear coated panel was baked at 140° C. for 30 minutes to obtain a cured film. The coated film was evaluated according to the same manner as described in Example 1. The result was shown in Table 10.

Meanwhile, the aqueous type metallic base paint comprises 15 parts of aluminium pigment paste having an aluminium flake content of 65% ("Alpaste 7160N" available from Toyo Aluminium K.K.), 30 parts of methylolated melamine resin ("Cymel 303" available from Mitsui Toatsu Kagaku K.K.), 2 parts of isostearic phosphate ("Phosphorex A-180L available from Sakai Kagaku K.K."), 112 parts of acrylic resin varnish prepared in preparative example 1 of the U.S. Pat. No. 5,183,504, having a number average molecular weight of 12000, a hydroxyl value of 70, an acid value of 58 and a solid content of 50%, and 43 parts of urethane emulsion having an acid value of 16.2 and a solid content of 33%.

Examples 9 to 11

Clear coating compositions containing crosslinked resin particles were prepared and evaluated according to substantially the same manner as described in Example 1, except that the compositions tabulated in the following Table 8 were used. The results were shown in Table 10.

Comparative Examples 1 to 5

Comparative Examples 1 to 5 illustrate coating compositions which comprises curable resin compositions obtained in Preparative Examples 24 and 25.

Clear coating compositions containing crosslinked resin particles were prepared and evaluated according to substantially the same manner as described in Example 1, except that the compositions tabulated in the following Table 9 were used. The results were shown in Table 10.

TABLE 7

| Example no. | Polyacid | Polyepoxide | Curing catalysts (solid) | | | | |
|---|---|---|---|---|---|---|---|
| 1 | A-I (PEx. 9) 73.0 | B-I (PEx. 19) 100.0 | TBABr*5 0.3 | Scat30*1 0.1 | | T384*3 2.0 | T123*4 2.0 |
| 2 | A-I (PEx. 9) 76.3 | B-II (PEx. 20) 88.7 | TBABr 0.3 | Scat30 0.1 | | T384 1.0 | T123 1.0 |
| 3 | A-II (PEx. 10) 89.7 | B-I (PEx. 19) 78.6 | TBABr 0.4 | Scat30 0.2 | | T384 2.0 | T123 2.0 |
| 4 | A-II (PEx. 10) 89.7 | B-II (PEx. 20) 81.6 | TBABr 0.4 | Scat30 0.1 | | T384 2.0 | T123 2.0 |
| 5 | A-III (PEx. 11) 111.9 | B-III (PEx. 21) 75.5 | TBS025*6 0.3 | TBAPTS*7 0.3 | Scat28*2 1.0 | T384 2.0 | T123 2.0 |
| 6 | A-IV (PEx. 12) 134.9 | B-III (PEx. 21) 45.4 | TBS025 0.3 | TBAPTS 0.3 | Scat28 1.0 | T384 2.0 | T123 2.0 |

*1 "Scat-30", dibutyl tin sulfonate available from Sankyo Yuki Gosei K.K.
*2 "Scat-28", dibutyl tin bis-(butyl maleate) available from Sankyo Yuki Gosei K.K.
*3 "Tinubin 384", a UV absorber available from Ciba Geigy A.G.
*4 "Tinubin 123", a hindered amine light stabilizer available from Ciba Geigy A.G.
*5 Tetrabutylammonium bromide
*6 Tetrabutylammonium salicylate
*7 Tetrabutylammonium paratoluene sulfonate

TABLE 8

| Example no. | Polyacid | Polyepoxide | Curing catalysts (solid) | | | | |
|---|---|---|---|---|---|---|---|
| 7 | A-V (PEx. 13) 89.4 | B-IV (PEx. 22) 76.9 | TBS025*6 0.3 | TBAPTS*7 0.3 | Scat28*2 1.0 | T384*3 2.0 | T123*4 2.0 |
| 8 | A-VI (PEx. 14) 68.5 | B-V (PEx. 23) 94.1 | TBS025 0.3 | TBAPTS 0.3 | Scat28 1.0 | T384 2.0 | T123 2.0 |
| 9 | A-VIII (PEx. 16) 68.8 | B-I (PEx. 19) 88.3 | TBABr*5 0.4 | Scat30*1 0.2 | | T384 2.0 | T123 2.0 |

TABLE 8-continued

| Example no. | Polyacid | Polyepoxide | Curing catalysts (solid) | | | | |
|---|---|---|---|---|---|---|---|
| 10 | A-IX<br>(PEx. 17)<br>98.0 | B-I<br>(PEx. 19)<br>72.5 | TBABr<br>0.4 | Scat30<br>0.2 | | T384<br>2.0 | T123<br>2.0 |
| 11 | A-X<br>(PEx. 18)<br>91.6 | B-II<br>(PEx. 20)<br>87.8 | TBABr<br>0.4 | Scat30<br>0.2 | | T384<br>2.0 | T123<br>2.0 |

*1 "Scat-30", dibutyl tin sulfonate available from Sankyo Yuki Gosei K.K.
*2 "Scat-28", dibutyl tin bis-(butyl maleate) available from Sankyo Yuki Gosei K.K.
*3 "Tinubin 384", a UV absorber available from Ciba Geigy A.G.
*4 "Tinubin 123", a hindered amine light stabilizer available from Ciba Geigy A.G.
*5 Tetrabutylammonium bromide
*6 Tetrabutylammonium salicylate
*7 Tetrabutylammonium paratoluene sulfonate

TABLE 9

| Example no. | Polyacid | Polyepoxide | Curing catalysts (solid) | | | | |
|---|---|---|---|---|---|---|---|
| Comp. 1 | A-I<br>(PEx. 9)<br>76.8 | B-VI<br>(PEx. 24)<br>85.1 | TBS025*6<br>0.3 | TBAPTS*7<br>0.3 | Scat28*2<br>1.0 | T384*3<br>2.0 | T123*4<br>2.0 |
| Comp. 2 | A-VIII<br>(PEx. 16)<br>97.2 | B-VII<br>(PEx. 25)<br>69.2 | TBABr*5<br>0.4 | Scat30*1<br>0.2 | | T384<br>2.0 | T123<br>2.0 |
| Comp. 3 | A-VII<br>(PEx. 15)<br>104.0 | B-VII<br>(PEx. 25)<br>72.0 | TBS025<br>0.3 | TBAPTS<br>0.3 | Scat28<br>1.0 | T384<br>2.0 | T123<br>2.0 |
| Comp. 4 | A-IX<br>(PEx. 17)<br>98.4 | B-VI<br>(PEx. 24)<br>69.5 | TBABr<br>0.4 | Scat30<br>0.2 | | T384<br>2.0 | T123<br>2.0 |
| Comp. 5 | A-X<br>(PEx. 18)<br>91.6 | B-II<br>(PEx. 25)<br>87.8 | TBS025<br>0.3 | TBAPTS<br>0.3 | Scat28<br>1.0 | T384<br>2.0 | T123<br>2.0 |

*1 "Scat-30", dibutyl tin sulfonate available from Sankyo Yuki Gosei K.K.
*2 "Scat-28", dibutyl tin bis-(butyl maleate) available from Sankyo Yuki Gosei K.K.
*3 "Tinubin 384", a UV absorber available from Ciba Geigy A.G.
*4 "Tinubin 123", a hindered amine light stabilizer available from Ciba Geigy A.G.
*5 Tetrabutylammonium bromide
*6 Tetrabutylammonium salicylate
*7 Tetrabutylammonium paratoluene sulfonate

TABLE 10

| Example | Acid resist. | Mar resist. | Cracking resist. | Chipping resist. | Storage stability |
|---|---|---|---|---|---|
| 1 | ⊚ | 91 | ○ | ○ | ○ |
| 2 | ⊚ | 92 | ○ | ○ | ○ |
| 3 | ⊚ | 95 | ○ | ○ | ○ |
| 4 | ⊚ | 91 | ○ | ○ | ○ |
| 5 | ⊚ | 91 | ○ | ○ | ○ |
| 6 | ⊚ | 90 | ○ | ○ | ○ |
| 7 | ⊚ | 96 | ○ | ○ | ○ |
| 8 | ⊚ | 93 | ○ | ○ | ○ |
| 9 | ⊚ | 90 | ○ | ○ | ○ |
| 10 | ○ | 82 | ○ | ○ | Δ |
| 11 | ○ | 85 | ○ | ○ | Δ |
| Comp. 1 | ⊚ | 82 | Δ | Δ | Δ |
| Comp. 2 | ⊚ | 75 | x | x | Δ |
| Comp. 3 | ⊚ | 80 | Δ | Δ | Δ |
| Comp. 4 | ○ | 70 | Δ | Δ | Δ |
| Comp. 5 | ○ | 73 | Δ | Δ | Δ |

Table 10 shows that the coating compositions of examples 1 to 11 has good storage stability and provide a clear cured film having excellent mar resistance and sealer cracking resistance, by comparison with those of the comparative examples.

What is claimed is:

1. A curable resin coating composition for use in automotive topcoating comprising, as a binder component:

(a) 20 to 80% by weight of a polycarboxylic acid having an acid value of 25 to 300 mg KOH/g based on solid and a number average molecular weight of 500 to 20000, wherein the polycarboxylc acid has carboxyl and carboxylate groups, which is obtained by reacting:
a polyacid anhydride with a monoalcohol having 1 to 12 carbon atoms:
in the proportion so that the molar ratio of the acid anhydride group to the hydroxyl group becomes 1/10 to 1/1, and wherein the polyacid anhydride is obtained by copolymerizing 10 to 50% by weight of an acid anhydride group-containing ethylenically unsaturated monomer;
5 to 90% by weight of a carboxyl croup-containing ethylenically unsaturated monomer; and
0 to 85% by weight of an ethylenically unsaturated monomer having neither acid anhydride nor carboxyl groups; and (b) 20 to 80% by weight of a polyepoxide having hydroxyl and epoxy groups, and a hydroxy value of 30 to 300, an epoxy equivalent of 100 to 800 and a number average molecular weight of 500 to 20000, prepared by copolymerizing:

(1) 10 to 60% by weight of an epoxy group-containing ethylenically unsaturated monomer represented by the formula:

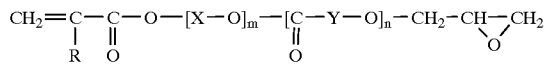
(I)

wherein, R represents a hydrogen atom or a methyl group, X represents a linear or branched saturated or unsaturated hydrocarbon moiety having 2 to 6 carbon atoms, Y represents a linear alkylene group having 4 to 6 carbon atoms, m represents an integer of 1 to 6, n represents an integer of 0 to 6;

(2) 5 to 60k by weight of a hydroxyl group-containing ethylenically unsaturated monomer; and (3) 0 to 85% by weight of an ethylenically unsaturated monomer having neither epoxy nor hydroxyl groups.

2. The curable resin coating composition for use in automotive topcoating according to claim 1, wherein the hydroxyl group-containing ethylenically unsaturated monomer (b) (2) has a structure represented by the formula:

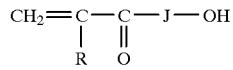
(II)

wherein R is a hydrogen atom or a methyl group, and J is an organic chain represented by the formula:

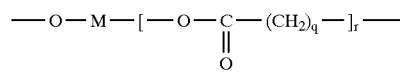

wherein M is a linear or branched alkylene group having 2 to 8 carbon atoms, q is an integer of 3 to 7 and r is an integer of 0 to 4, or an organic chain represented by the formula:

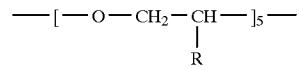

wherein R is a hydrogen atom or a methyl group and s is an integer of 2 to 50.

3. The curable resin composition according to claim 1, wherein the composition further comprises a quaternary ammonium salt as a catalyst.

4. The curable resin coating composition for use in automotive topcoating according to claim 1, wherein the composition further comprises an organic tin compound as a catalyst.

5. The curable resin coating composition according to claim 1, wherein the curable resin coating composition further comprises crosslinked resin particles.

* * * * *